United States Patent [19]

Byford

[11] 4,304,629
[45] Dec. 8, 1981

[54] OBJECT IMPACT DISCRIMINATOR

[75] Inventor: Roger G. Byford, Apollo, Pa.

[73] Assignee: Westinghouse Electric Corp., Pittsburgh, Pa.

[21] Appl. No.: 36,715

[22] Filed: May 7, 1979

[51] Int. Cl.³ .............................................. G21C 17/00
[52] U.S. Cl. .................................................... 376/245
[58] Field of Search ............. 176/19 R, 20 R; 73/579, 73/24

[56] References Cited

U.S. PATENT DOCUMENTS

| | | | |
|---|---|---|---|
| 3,860,480 | 1/1975 | Carteus et al. | 176/19 R |
| 3,860,481 | 1/1975 | Gopal et al. | 176/19 R |
| 3,979,255 | 9/1976 | Bulgier et al. | 176/20 R |
| 4,016,034 | 4/1977 | Musick | 176/24 |

Primary Examiner—S. A. Cangialosi
Attorney, Agent, or Firm—C. M. Lorin

[57] ABSTRACT

A system for discriminating between hard object impact detected by a transducer and background noise or electrical noise spikes, which uses the detection of a series of cross-over points during a plurality of time intervals as an indication of a true impact signal.

8 Claims, 7 Drawing Figures

OBJECT IMPACT DISCRIMINATOR

BACKGROUND OF THE INVENTION

This invention pertains in general to the detection of impact on a wall by objects such as projectiles, debris or loose parts in an environment surrounded by a wall, and more particularly to the discrimination between an electrical signal outputted by a transducer upon impact and parasitic signals which could be taken for an impact representative signal.

It is desirable in the operation of pressurized water reactor power generating stations to provide a system which will enable an early detection and survey of the failure of primary system components. Early detection of component failures will prevent the occurrence of dangerous operating conditions such as failure of mechanical components which characteristically results in metal debris which concentrate in the steam generator inlet plenum and the bottom plenum of the reactor vessel. Those locations being the most probable collecting points are the most suitable for the detection by a monitoring system. The debris are transported to those collecting points by the normal flow of the primary coolant and are propelled during the course of travel against the walls enclosing the primary system coolant paths. Accordingly, transducers judicially placed at different locations against the walls will provide an indication of any such primary system component failure.

A system has been employed in the past for detecting the mechanical state of a machine which is described in U.S. Pat. No. 3,554,012, issued Jan. 12, 1971. The system there described converts the mechanical vibrations occurring within the machine into analogous electrical vibrations by means of a sensor, and analyzes the output electrical oscillations. During the conversion, initial shock waves radiate from the point of impact and create mechanical transients in the measuring system. This technique utilizes the transient response at the resonant frequency of the transducer, rather than the initial shock response of the transducer to obtain the output parameters. The resultant response is a continuous oscillation of relatively low amplitude at the resonant frequency of the transducer which includes transients within such continuous oscillation. The equipment is designed to discriminate between relatively small amplitude levels, thereby to lower the sensitivity of the system response.

An improvement over this is described in U.S. Pat. No. 3,860,481, issued Jan. 14, 1975. The concept, here, is to generate discrete outputs indicative one of the rate of the energy impact, the other of the impact energy.

While piezoelectric accelerometers which are used to detect signals generated by metallic impacts within nuclear reactor vessels provide an amplified output signal (frequency range 0–20 kHz), the impact generated signals must be distinguishable from both the flow generated background noise and the electrical noise "spikes".

The simplest known method for such discrimination consists in comparing the transducer output signal with a fixed setpoint. If the signal level exceeds the setpoint an impact is said to have occurred.

The shortcomings of this method are twofold. First, the background noise level varies as plant operating conditions change. Since the setpoint must be higher than the highest background noise level ever present, an unnecessarily high setpoint exists when the background noise level is low. Secondly, the device makes no attempt to distinguish electrical noise spikes from impact signals.

Another approach stems from the fact that hard object impact signals are of greater duration than electrical noise spikes. The transducer output signal is put through an envelope detector. Discrimination against background noise is then accomplished on a "level setpoint" basis, whereas discrimination against noise "spikes" is on a "time above setpoint" basis. Although this method can be used with success in general, the envelope may be too idealized a waveform. In practice, the envelope may be ineffective to detect an actual impact.

SUMMARY OF THE INVENTION

In order to improve the discrimination of a signal due to impact by a hard object within a nuclear reactor vessel against flow generated background noise and electrically generated noise "spikes," the present invention proposes to use a level setpoint which is not fixed, but rather which follows the changes in the background noise level. As a result, the setpoint can actually be lower than the peak background noise level. However, with a noise spike the peak level is reached only briefly and occasionally, whereas with an impact signal there will be a repeated occurrence of a level above the setpoint. The invention is based on such distinction.

The impact signal discriminator according to the present invention provides, besides a signal magnitude related setpoint level, a combination of means for detecting a plurality of consecutive cross-over points relative to the associated setpoint and for generating an impact indicative signal which is essentially representative of such repetitive occurrence, rather than any particular shape, duration, or magnitude, of the triggering signal derived from the transducer.

BRIEF DESCRIPTION OF THE DRAWINGS

FIG. 4A illustrates with curves why an ideal impact signal is effectively detected by the method of FIGS. 2 and 3 involving a fixed setpoint relation to the envelope, whereas

DESCRIPTION OF THE PARTICULAR FIELD OF APPLICATION OF THE INVENTION

Figure 1:
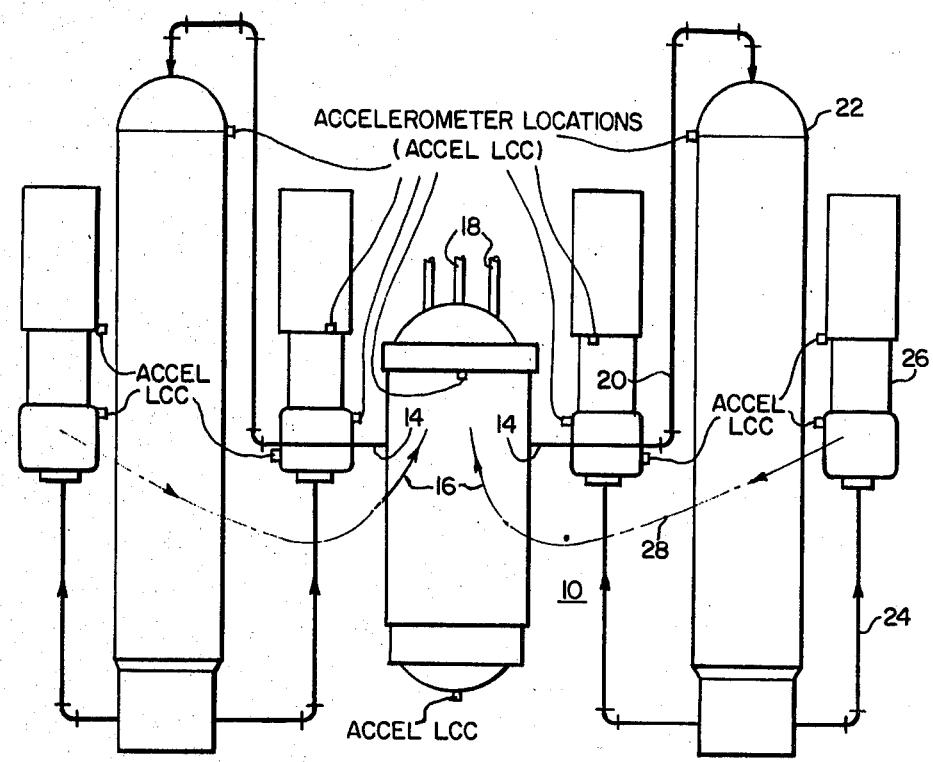
FIG. 1 is a schematic view of a nuclear reactor provided with transducers illustratively positioned at several locations for the detection of hard object impacts within the vessel. The impact discriminator according to the present invention is associated with such transducers.

The present invention is embodied in a detection system including transducers upon which a shock is imparted through a wall by the impact of hard objects such as metal debris or loose parts trapped at the steam generator inlet plenum and the reactor vessel lower plenum within the primary system of a nuclear reactor. As shown in FIG. 1, transducers are located at various locations against the enclosure walls in order to sense vibrations and impacts occurring behind the walls. The presence of such debris, or loose parts, must be continually monitored. These debris originating from failure of primary system components, are moved by the primary coolant flow and propelled against the walls of the vessels and conduits confining the coolant. The energy imparted to the enclosure walls is continually sensed at the resonant frequency of the metal material forming the wall structure to provide an electrical output indicative thereof.

The energy of each impact is transformed into an output pulse having an amplitude proportional to the impact energy level. A bandpass filter further refines the system to pass only those signals within the frequency range characteristic of metal impacts, thus eliminating background noise which might otherwise obscure the impact response. The resultant output is applied to the signal discriminator system according to the invention in order to alert the reactor plant operator so that he will be able to take corrective action and prevent excessive plant damage. Preferably the system triggers an alarm whenever a time impact signal has been detected.

It is the object of the present invention to discriminate between signals which may have another origin and those which actually are transducer signals due to the impact of hard objects in the zone of detection.

FIG. 1 shows a planned view of a nuclear reactor power generator system of the pressurized water type illustrating the relative position of the sensors employed in this exemplary embodiment for monitoring hard object impacts sustained by the primary system components confining the reactor coolant. A pressurized vessel 10 is shown which forms a pressurized container when sealed by its head assembly 12. The vessel has coolant flow inlet means 16 and coolant flow output means 14 formed integral with and through its cylindrical walls. As known in the art, the vessel 10 contains a nuclear core (not shown) consisting mainly of a plurality of clad nuclear fuel elements which generate substantial amounts of heat depending primarily upon the position of a control means, the pressure vessel housing 18 of which is shown. The heat generated by the reactor core is conveyed from the core by the coolant flow entering through inlet means 16 and exiting through outlet means 14. The flow exiting through outlet means 14 is conveyed through hot leg conduit 20 to a heat exhange steam generator 22. The steam generator 22 is of a type wherein the heated coolant flow is conveyed through tubes (not shown) which are in heat exchange relationship with the water which is utilized to produce steam. The steam produced by the generator 22 is commonly utilized to drive a turbine (not shown) for the production of electricity. The flow proceeds from the steam generator 22 through conduit 24 to a pump 26 and inlet means 16. Thus, a closed recycling primary or steam generating loop is provided with the coolant piping coupling the vessel 10, the steam generator 22, and the pump 26. The generating system illustrated in FIG. 1 includes four such closed fluid flow systems or loops. The number of such systems may vary from plant to plant, but commonly two, three or four are employed.

An undesirable level of radioactive emission can occur in the unlikely event of a failure or rupture of the fuel rod cladding encasing the fissionable material within the reactor core, thereby increasing the risk of fission products from the fuel entering the coolant. Similarly, a failure of the coolant could impair the dissipation of heat and result in a melt down of the core structure with a release of dangerous products into the coolant. Such a dangerous situation can be the result of a structural failure within the primary system. The failure of mechanical components could cause metal debris to concentrate in the steam generator inlet plenum and the bottom plenum of the reactor vessel. Moreover, such debris, suspended within the coolant, could inhibit the flow of coolant as just explained. Therefore, an early recognition of damaged system components is important.

The object of the present invention is to monitor possible impacts by hard objects upon the walls surrounding the coolant flow path at any of a number of locations within the primary system of a nuclear reactor coolant installation.

GENERAL DESCRIPTION OF THE INVENTION

Figure 2:
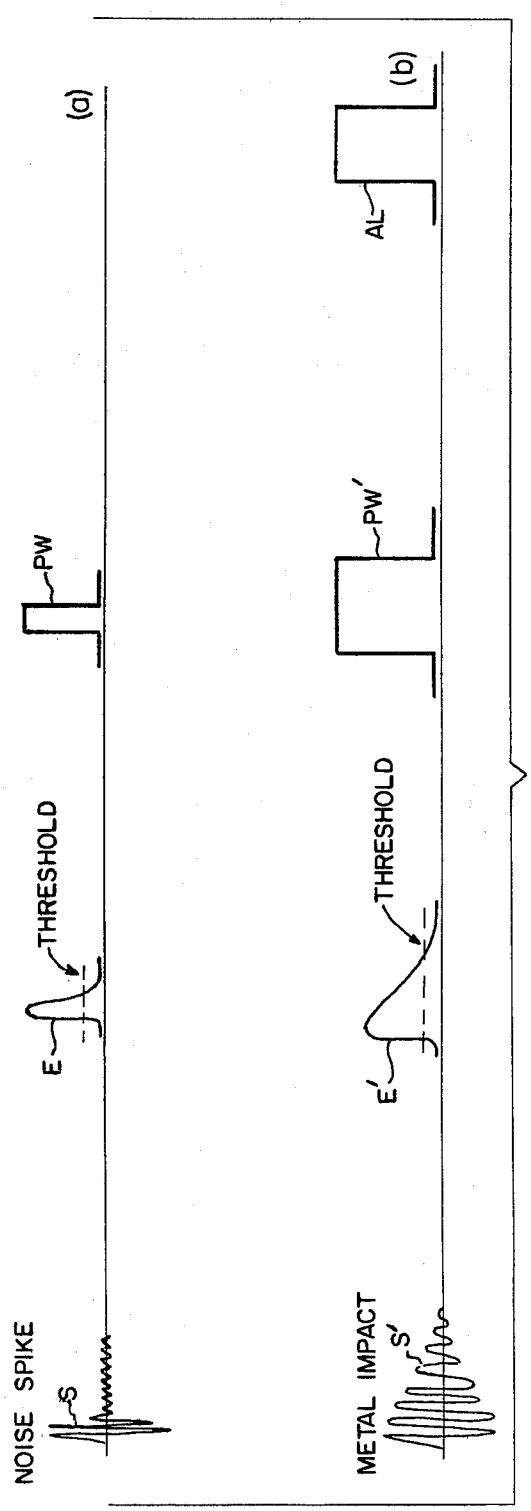
FIG. 2 shows, by comparing two curves, why the envelope of the detected signal can be used in general to discriminate an actual impact signal against a mere noise spike.

Referring to FIG. 2, curves (a) and (b) show, for the sake of comparison, a noise "spike" S and an impact signal S' detected by a method employing an envelope detector and based on the duration of the mean of the envelope (E, E'), to charcterize a true impact signal. The threshold, when set at the mean level, determines two cross-over points of the envelope at AB, AB' which are translated into a square pulse (PW PW') of corresponding width. If the detector is made insensitive to a minimum width, it is clear that there will be no response (AL) to a signal like (S). Curves (a) and (b) are each associated with a detected envelope (E, E') with a threshold level intersecting at cross-over points AB, AB'. The corresponding pulse-width modulated pulses are PW, PW', and the final response of the system is in the form of an alarm signal (AL, AL') which is OFF in the situation of curve (a) and ON in the case of curve (b).

Figure 3:
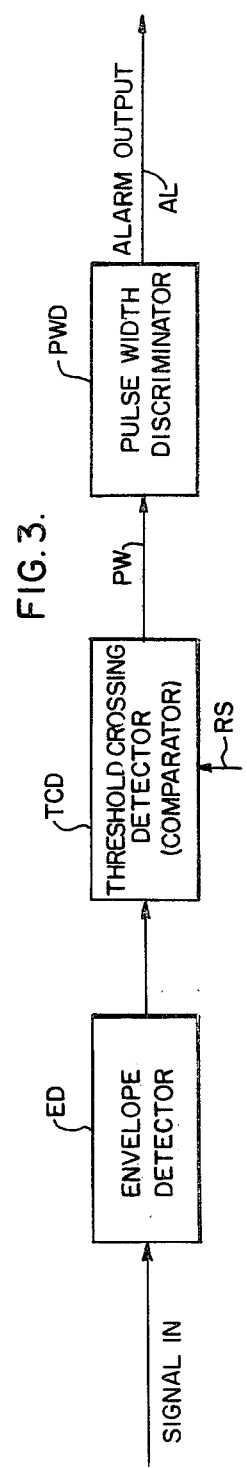
FIG. 3 is a general block diagram used to implement the method illustrated by FIG. 2.

Referring to FIG. 3 a typical system using the technique of FIG. 2 is illustrated in block diagram. It includes: an envelope detector ED, a threshold crossing detector TCD set by a reference signal RS to cause the generation of pulse width modulated pulses (PW or PW') and a pulse width discriminator for deriving the alarm output (AL or AL').

Figure 4A:
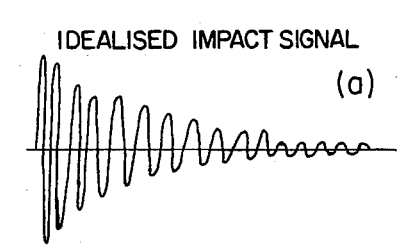
Figure 4A:
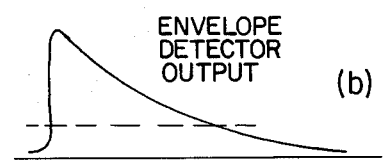
Figure 4A:
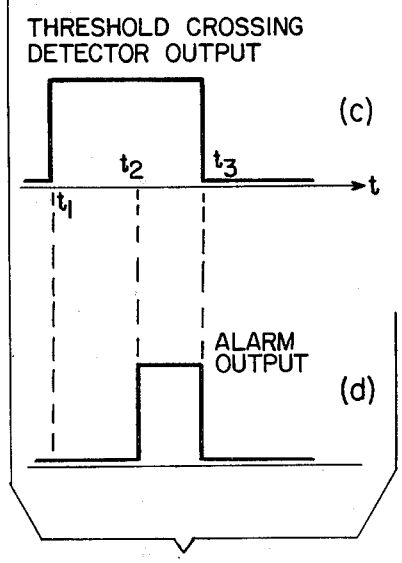

Referring to FIG. 4A, curve (a) shows an impact signal which is idealized in that the magnitude of the successive peaks of the signal follow an envelope such as shown by curve (b), e.g., a gradually varying curve. With such ideal situation, the method consisting in triggering an alarm signal by the envelope when it exceeds for a sufficient time a threshold level, or setpoint (SP), can be successfully implemented. Pulse-width detection is as shown by pulse (c) causing triggering of an alarm (curve d), if the duration of the pulse $(t_1 - t_3)$ exceeds the minimum time $(t_1 - t_2)$ assigned by the system. Thus, a "spike" noise which would last less than $(t_1 - t_2)$ will not trigger the alarm.

Figure 4B:
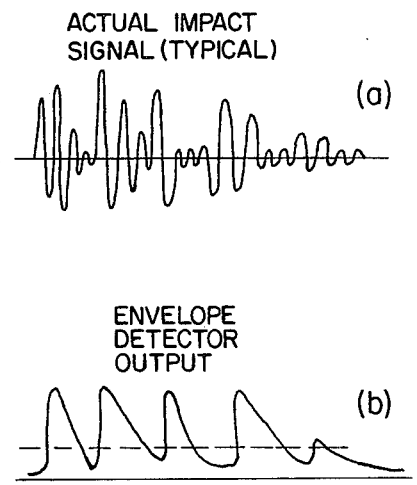
FIG. 4B shows with curves that an actual impact signal can remain undetected when a true envelope is associated with the fixed setpoint of the method of FIGS. 2 and 3.
Figure 4B:
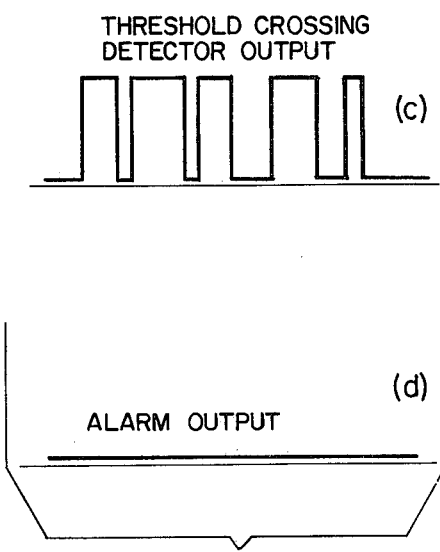

However, in contrast to such ideal situation, the output of the transducer under impact of an object against the wall of the vessel in actuality rather as shown by curve (a) of FIG. 4B. If the envelope is used by reference to the same threshold, or setpoint SP, it appears from curve (b) that the system will in fact detect a series of cross-over points such as A'B', A"B", etc. Each cross-over point beyond the threshold (A', A", . . . ) is followed by a cross-over back through the threshold (B', B", . . . ). It appears that when following the method pursuant to FIG. 4A, a series of pulses (shown by curve (c)) may ensue, each of which having a width which is smaller than $(t_1-t_2)$. In such case the alarm will not be actuated (see curve (d)) by the pulse width discriminator (FIG. 3). Therefore, the problem is to be able to distinguish between short duration peaks which are isolated, such as a noise "spike" and those which are in fact so related to each other in time that they must pertain to a single "impact signal".

To solve this problem, it is proposed according to the present invention to count successive cross-over points in order to detect a close succession of peaks. More specifically, the successive peaks are identified by the occurrence of several cross-over points within a predetermined time interval. It is sufficient that a minimum number of peaks be detected within such a time interval in order to ascertain that they pertain to an impact signal. In order to more closely identify the "signature" of the impact signal, the invention further proposes to count a minimum number of such time intervals having the required number of cross-over points before triggering the alarm. The general implementation of an impact detection system according to the invention is as follows:

A level setpoint is derived by performing an AC to DC conversion on the input signal, amplifying the DC output voltage, and passing it through a low pass filter. The resultant setpoint is then compared with the incoming signal. If the system detects $p_1$ consecutive periods (each of $m_1$ milliseconds) in each of which the signal has crossed the setpoint $n_1$ or more times, then an impact is said to have occurred. $p_1$ and $m_1$ are selected such that the period $p_1 m_1$ for which the signal must remain at a high level, in order for an impact to be said to have occurred, is greater than the duration of electrical noise spikes. In order to avoid the occurrence of more than one output from a single impact, the system changes its mode of operation when an impact is detected, and searches for $p_2$ consecutive periods (each of $m_2$ milliseconds) in each of which the signal has crossed the setpoint less than $n_2$ times. When this has occurred, the system is reset. It is then ready to detect more impacts. The numbers $m_1$, $n_1$, and $p_1$ may, or may not, be equal to the numbers $m_2$, $n_2$ and $p_2$ respectively. In practice, $m_1$ and $m_2$ are usually chosen to be equal, as are $n_1$ and $n_2$, while period $p_2$ is somewhat greater than period $p_1$. This system affords two distinct advantages over prior art systems. First, the level setpoint will follow the changes in the background noise level, and can actually be lower than the peak background noise level, since this peak level is reached only briefly and occasionally, and the device will not, therefore, be triggered. Secondly, the time interval $m$ ($=m_1=m_2$) can be so chosen that short term random fluctuations in the impact signal will not affect the operation of the device.

Successful results have been obtained with a time interval m=2 msec, and with a number of setpoint crossings required selected to be n=3. If the signal amplitude is continuously high, it is certain that there will be considerably more than 3 setpoint crossings in each 2 msec period. Even if the level fluctuates, it is still very likely that there will be at least three crossings in each 2 msec period.

DESCRIPTION OF THE PREFERRED EMBODIMENT

Figure 5:
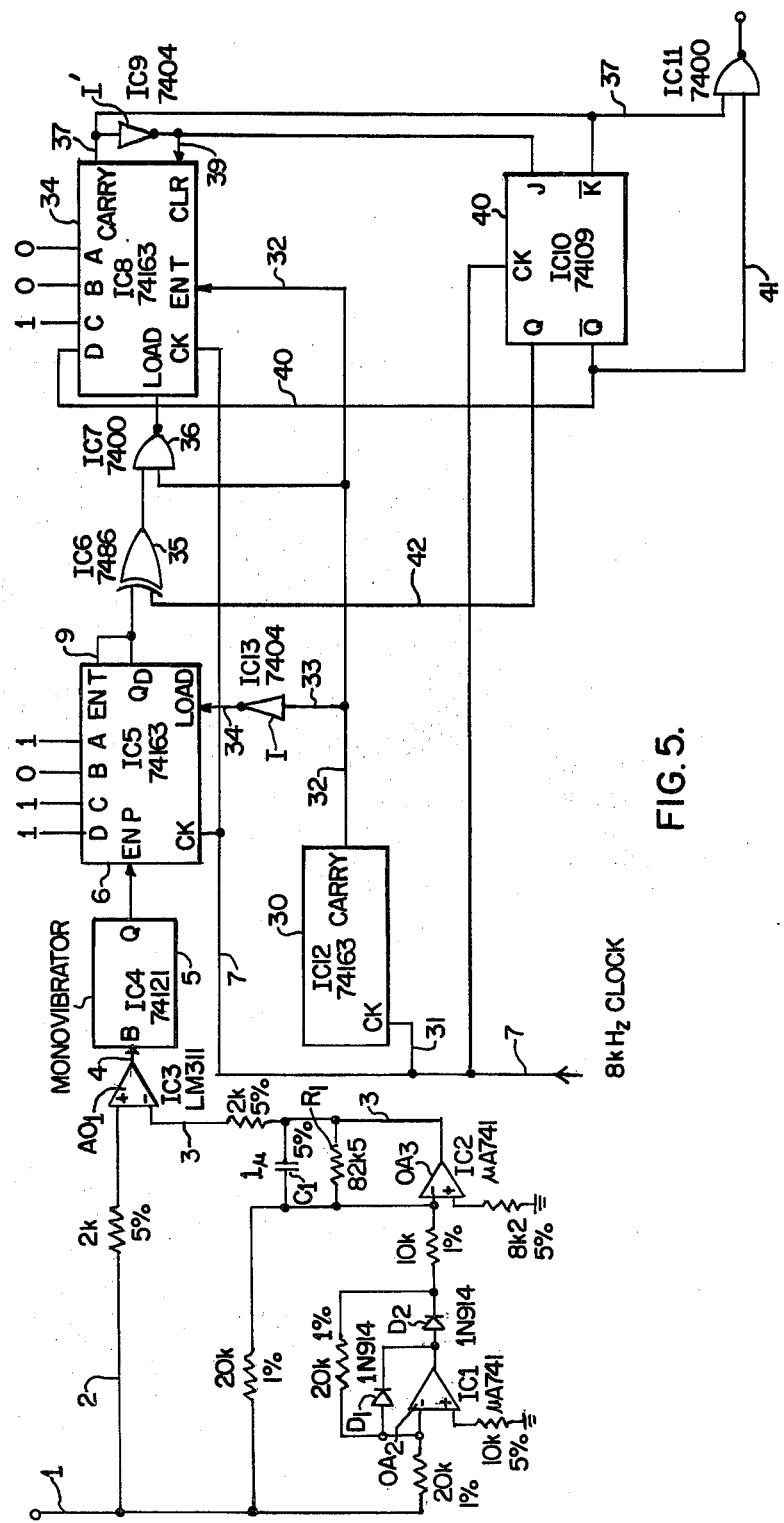
FIG. 5 is a circuit diagram illustrating one implementation and the operation of the impact discriminator system according to the invention.

Referring to FIG. 5, the signal derived on line 1 from the transducer (not shown) is inputted into the inverting input of an operational amplifier $OA_1$ connected as a comparator. From line 1 the transducer output signal is also inputted into the inverting input of operational amplifier $OA_2$, mounted for AC-to-DC conversion, as generally known. The gain is unity and a diode $D_1$ is connected between the inverting input of $OA_2$ and the output thereof. Another diode $D_2$ is connected between the output of $OA_2$ and the inverting input of another operational amplifier $OA_3$, of gain 8. A capacitor $C_1$ (1 $\mu$f) is in the feedback loop of $OA_3$ in parallel with a resistor $R_1$ (82.5 K$\Omega$) in order to provide filtering. The output from operational amplifier $OA_3$ is applied by line 3 to the non-inverting input of operational amplifier $OA_1$.

Therefore, the transducer signal from line 1 is continuously compared by operational amplifier $OA_1$ to its average level as derived on line 3. Whenever the transducer output signal exceeds its mean, the output of operational amplifier $OA_1$ on line 4 goes positive. Whenever the magnitude of the signal goes below such threshold level, the voltage of line 4 goes negative.

Line 4 is inputted into a monovibrator 5 which is a solid state device known on the market as 74121. Monovibrator 5 generates a 125 microsecond pulse which is applied to the enable (EN) pin of a solid state counter 6 of the type known as 74162.

On line 7 to the clock pin of device 6 a clock signal of frequency 8 KHz is applied, thereby to have a period which matches the 125 $\mu$s duration of an enabling pulse from device 5, to insure that the positive edge will cause a count to be registered synchronously with the clock signal. The load pin of device 6 presets the count of the device to 13 by establishing state of the pins DC, BA which correspond to the binary number 1101. Device 6 being capable of counting up to 16, the clock will only register three counts from such preset number. When the count 26 is reached, pin $Q_D$ goes to zero and by line 9 causes by pin END the preset number to be cancelled and the device to be disabled, thus ready to be triggered again by monovibrator 6. Loading (or presetting) of device 6 occurs only once every 16 clocking step due to the solid state device 30 being clocked by line 7 via line 31 and generating on lines 32, 33. After an inversion I a loading pulse to the LOAD pin of device 6 (via line 34), thus every 9 milliseconds. Therefore, if at some time the signal exceeds the setpoint, comparator $DA_1$ will cause counter 6 to count up one at the reset clock occurrence. The counter is loaded to 13 every 2 millisecond by device 30. In this time interval of 2 millisecond, device 6 might be counting 3 setpoint crossings before going low at pin $Q_D$, e.g. before being disabled (by line 9) until the next load pulse presets the device for the subsequent 2 millisecond time interval.

FIG. 5 also shows a second solid state counter 34 like counter 6 which is enabled by line 32 from the carry pin of device 30.

The data output $Q_D$ from device 6 is applied through an Exclusive-Or device 35 outputted into a NOR device 36 to control the state of the LOAD pin of device 34. The preset digits DCBA are chosen to be for 12, except when the most significant bit 0 is inverted, by input line 40, then the present value becomes a 4. Thus, counter 34 may be counting either from 4 on up to 15 for eleven consecutive time intervals of 2 ms, or from 12 to the maximum count of 15. The preset number is cleared when the output 37 (carry pin of device 34) is high because it feeds through an inverter I' into the CLR pin by line 39. The operation is as follows: If the requisite number of setpoint crossings has been counted by device 6 during the 2 ms period, device 34 will count up one at the end of the period; otherwise it will be loaded to 12. If, then, three consecutive 2 ms periods occur, in each of which 3, or more, setpoint crossings have occurred, device 34 will count to 15, and the carry output will go high.

FIG. 5 shows a solid state flip-flop device 40 of the type 74109 having its J input controlled by the state of line 39. When line 37 is high the $\overline{Q}$ output of device 40 will also be high. Lines 41 from such $\overline{Q}$ pin of device 40 and line 37 from device 34 being both inputted in NAND device 38, the output of device 38 will go low indicating that an impact has occurred.

At the next clock, counter 34 will be cleared to zero, and flip-flop 40 will change state, with the Q output going high, and $\overline{Q}$ going low. As a result, the mode of operation of the system is now changed somewhat. The effect of feeding by line 42 a logical 1 from the Q output of flip-flop 40 into the input of Exclusive OR device 35 is to invert the signal which is going from $Q_D$ of device 34 to the load input of NAND device 38. Counts 34 will now, count up 1 every 2 ms only if counter 6 has not counted 3 or more zero crossings in the previous 2 ms. Also, since the Q pin of device 46 is connected by line 40 to the D input of counter 36, when the signal continues to cross the setpoint frequently, device 34 will be loaded to 4 (binary 0100) every 2 ms. Eleven consecutive 2 ms periods, each with 2 or less setpoint crossings, are therefore required before the device 34 reaches 15 and its carry output can go high. When eleven such periods occur, the carry output of device 34 goes high, and at the next clock flip-flop 40 changes back to its original state. The device is now ready to detect further impacts.

It is observed that the setpoint established by the AC/DC converter on line 3 increases quickly during an impact and decreases again relatively slowly after the impact. However, it is difficult without a compromise to reconcile having the setpoint rise very fast during an impact (in which case it may be too fast to detect the impact) and having the setpoint fall too slowly after impact (in which case a second impact closely following the first might not be detected). In order to avoid such drawback, it is proposed in the first two stages providing AC to DC conversion, gain and low-pass filtering to have the low-pass filter cut-off frequency much higher, so that the output will follow the input variations much more rapidly, and to add a time delay in order to maintain the no impact setpoint long enough for counter 34 to establish the impact alarm condition.

Figure 6:
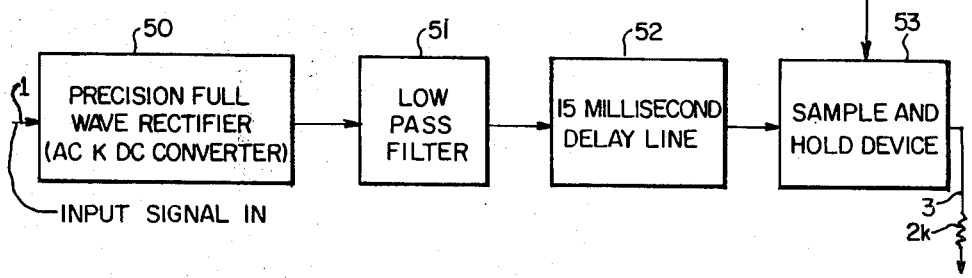
FIG. 6 is circuitry which can be associated with the circuit of FIG. 5 in another embodiment of the invention.

The arrangement is shown by FIG. 6 in which 50 is the AC/DC inverter arrangement built around operational amplifier OA$_2$, 51 is the low-pass filter built around operational amplifier OA$_3$, with the addition of a 15 millisecond delay line 52 and a sample and hold circuit 53 inserted between the output of OA$_3$ and the non-inverting input of OA$_1$ (see FIG. 1).

The sample and hold circuit is set in the sample mode by flip-flop 40 when the output of counter 34 is in the non-alarm state, and in the hold mode when the output of counter 34 is in the alarm state. The operation of the circuit of FIG. 6 is as follows:

During normal operation (i.e. no impacts) the sample and hold circuit 53 is in the sample mode, so that the setpoint is simply a delayed version of the low-pass filter output. If an impact occurs it will be detected before the output of the delay line 52 has begun to rise, since actually the impact detection occurs only about 6 ms (three time intervals) after the impact commences, and the delay line delay is 15 ms. At this time, the sample and hold device is put into the hold mode (switching between the sample mode and the hold mode being accomplished by an output of flip-flop 40). The level setpoint will therefore remain constant until the system has completed the resetting procedure described earlier. At this time the sample and hold unit is reset into the sample mode. Since the resetting procedure of counting eleven time intervals requires a longer time (22 ms) after the input signal has decreased again to its original level than the delay line delay (15 ms), the delay line output will by now have followed the input down to the background setpoint level.

I claim:

1. A method of recognizing an impact representative signal out of an incoming signal derived from a detector responsive to impact by debris or loose parts in a reactor vessel, comprising the steps of:
   detecting the occurrence of a plurality of signal excursions beyond a predetermined level; counting a predetermined minimum integer number $n_1$ greater than, or equal to, two of said excursions within a predetermined time interval; and
   providing an indication of the occurrence of said impact representative signal following at least two occurrences of said minimum number $n_1$ of excursions within said predetermined time interval.

2. The method of claim 1 with the provision of an initial operation conditioning step preceding said detecting step;
   said conditioning step being reinitiated following the occurrence of at least one said predetermined time interval with a count of excursions less than said predetermined minimum number $n_1$.

3. The method of claim 2 with said indication providing step being performed after $p_1$ occurrences of a count of said predetermined minimum number $n_1$;
   with the provision of the additional step of counting $p_2$ said predetermined time intervals within which there is a second minimum integer number $n_2$ of excursions of less than the first mentioned said first predetermined number $n_1$;
   said additional step being performed following said indication providing step; and
   with the provision of said conditioning step following the occurrence of said additional step.

4. The method of claim 3 with said predetermined time interval being larger than the short term random fluctuations of any undesirable background noise in said incoming signal.

5. Apparatus for the recognition of an impact representative signal out of an incoming signal derived from a detector responsive to impact by debris or loose parts in a reactor vessel, comprising:

means for detecting the occurrence of a plurality of signal excursions by said incoming signal beyond a predetermined level;

means for counting a predetermined integer number $n_1$ greater than, or equal to, two of said excursions within a predetermined time interval; and means operative in a first mode for providing an indication of the occurrence of said impact representative signal following at least two occurrences of said minimum number $n_1$ of excursions each within such said predetermined time interval.

6. The apparatus of claim 5 with said operative means in the first mode being operative to respond to the occurrence of $p_1$ consecutive said time intervals having a minimum of $n_1$ excursions counted by said counting means.

7. The apparatus of claim 6 with said operative means transferring to a second mode following an indication of the occurrence of said impact representative signal;

said operative means in the second mode being responsive to counts by said counting means during said time interval of less than said minimum number of excursions $n_1$;

said operative means being transferred back to the first mode following $p_2$ time intervals in the second mode.

8. The apparatus of claim 7 with conversion means responsive to said incoming signal for establishing a set point, as said threshold, at a level in relation to said incoming signal;

said conversion means having a time constant larger than the short term fluctuations of any undesirable background noise in said incoming signal.

* * * * *